ced May 1, 1956

2,744,005

PROCESS OF ACCELERATING THE FINAL PORTION OF THE DIRECT REDUCTION OF IRON OXIDE TO METALLIC IRON

Ford L. Coolman, Wadsworth, and Marion Ernest Graham, Parma, Ohio, assignors, by mesne assignments, to Republic Steel Corporation, Cleveland, Ohio, a corporation of New Jersey No Drawing. Application November 20, 1951,
Serial No. 257,414

1 Claim. (Cl. 75—34)

Our present invention relates to the process of accelerating the final portion of the direct reduction of iron oxide to metallic iron, and more particularly to a process of accelerating this reduction in a high temperature range in the presence of some gaseous HCl.

This application is a continuation-in-part of our prior and copending application, Serial No. 172,782, filed July 8, 1950, and having the same title as the present application, this application being now abandoned. The present application is intended as a substitute for the earlier application, so as to correct an inadvertent mistake made in the filing thereof.

It has been known in the prior art that when iron oxide-containing material is exposed at a sufficiently high temperature to the action of a suitable reducing gas, the oxide may be reduced. This action from a broad point of view takes place in a conventional blast furnace, wherein the temperatures are extremely high so that the reduced iron is melted, and wherein carbon and flux are mixed with the ore for the well known purposes. The present invention seeks to obtain the direct reduction of iron at substantially lower temperatures, so that the reduced iron is not melted, and so that any gangue present is permitted to remain in a solid condition.

This reducing reaction has also been effected at substantially lower temperatures in respect to those now contemplated for use, i. e., up to about 600° C., by the use of a powerful reducing gas such as hydrogen. In that low temperature range, the problem met with is that the reduced iron tends to be pyrophoric in character. In a copending application of Henry L. Crowley, Serial No. 160,829, filed May 8, 1950, now Patent No. 2,716,601, granted Aug. 30, 1955, entitled "Low Temperature Reduction of Iron Oxides in the Presence of Halide," the problem of preventing pyrophorism in this low temperature range is disclosed and claimed. As the temperatures at which the reduction takes place are raised over 600° C., the tendency towards pyrophorism progressively diminishes and then substantially vanishes.

It is desirable that iron oxides, in whatever degree of oxidation the iron may exist, be reducible at a temperature substantially below the melting point of iron, so as to produce elemental iron in a form which may be relatively easily comminuted and segregated from any gangue present, for example, by magnetic separation. This iron may be used in many ways, for example, in powder metallurgical methods of manufacturing metallic parts.

In the making of iron powder, it is generally found that the particle size of the powder made is a function of both the particle size of the oxide being reduced and the temperature of reduction. The finer the particle size of the oxide, the smaller will be the particles of the iron reduced therefrom. Also it is generally found that lower temperatures of reduction make for smaller particle size in the reduced iron. The present invention takes these principles into account.

It has further been found in the prior art that in attempting to reduce an iron oxide-containing material, such as pure iron oxide or an ore containing one or more of the oxides of iron, the problem of reduction of the oxide or oxides of iron to a point where about 80% of the oxygen originally combined with iron as an oxide is removed is relatively easy to accomplish. In fact this portion of the reduction may be done in a number of different ways. However, as the reduction proceeds above this 80% point and toward 100%, the removal of oxygen from the iron becomes increasingly difficult, and from the point of view of the prior art, is substantially impossible in the temperature range contemplated in accordance with the present invention. The present application provides a practical solution of this problem.

Summarizing, therefore, the present application relates to the treatment of an iron oxide-containing material, which may be an ore, a concentrate, or one or more pure oxides of iron, and wherein the oxide or oxides present may be $Fe_2O_3$ or $Fe_3O_4$ and possibly also FeO (although the latter is generally considered as an unstable oxide of iron and does not occur in nature). This material may be subjected to any known or desired process for the removal of about 80% of the oxygen of the original material which was combined with iron as one or more of the oxides of iron. Thereafter, and either as a separate process or as a continuation of the initial reducing operation, the remainder of the oxygen initially combined with iron as one or more oxides thereof, may be removed in accordance with the present invention. For this purpose, the semi-reduced material which is a term given for the purpose of the present invention to the material from which about 80% of the oxygen of the iron oxide or oxides has been removed, is disposed within a reducing zone, either by being maintained in this zone in which the initial portion of the reduction has taken place, or by being introduced into such a zone for the purpose of the process of the present application. While in this zone, the semi-reduced material is brought to or maintained at a temperature within the desired range. Broadly this range is from about 600° C. to about 900° C. and more specifically, as hereinafter set forth, is from about 650° C. to about 760° C. While in the reducing zone the semi-reduced material is exposed to a gaseous atmosphere which contains some hydrogen as an active reducing agent. It is unnecessary that hydrogen be admitted into the reducing zone as such, but it may be admitted, chemically combined in some constituent which is introduced, and be liberated as gaseous hydrogen as a result of some reaction occurring in this zone. This will be discussed more in detail hereinafter. There must also be present in the reducing zone in accordance with the present invention, some gaseous HCl. Broadly the limits of concentration of HCl to be used are from a trace or a very small amount, which for the purposes of this application may be taken to be 0.1% by volume as a minimum, up to that concentration which will chloridize iron to form some chloride of iron as $FeCl_2$ at a rate substantially faster than such chloride of iron can be reduced to elemental iron by the hydrogen present in the gaseous medium. As a mathematical value, this upper limit is probably in the order of magnitude of about 10% to about 15% by volume, even when the gaseous medium is otherwise pure hydrogen as hereinafter set forth. Specifically, the preferred concentration of HCl is about 1% by volume. Under these conditions it has been found that the substantial completion of the reaction in reducing the remainder of the iron to elemental form is feasible and may be accomplished within a reasonable time.

There will now be set forth the details of the process of the present invention as to the requirements for each phase thereof and the inter-relationships between them as well as theories, presently believed to be correct, tending to explain the novel results actually obtained.

The first thing to be considered is the type of materials operable or usable in accordance with the present process, that is, what is herein termed "iron oxide-containing material." This term is used herein to mean any material containing any substantial amount of any one or more of the oxides of iron, including $Fe_2O_3$ and $Fe_3O_4$. Also and to the extent that it may exist in any commercial material, this term is also intended to include FeO, although this compound is recognized as not being generally considered to be a stable oxide of iron and does not occur as such in nature. Among the commercial materials within the class contemplated for use according to this invention are the chemically pure oxide or oxides of iron, concentrates, naturally occurring iron ores of various kinds, which include not only one or more of the oxides of iron but also gangue, and many other equivalent materials as will occur to those skilled in the art, alone, in combination, and with or without other metals or metal compounds present. The only essential characteristic is that the material in question shall contain one or more of the oxides of iron in such an amount that it is commercially practicable to reduce the iron therefrom.

This material, prior to the treatment thereof in accordance with the present process, is preferably comminuted by any of the known methods usable for this purpose, to a sufficiently fine average particle size, so that the reduction reaction may occur in a reasonable time. Normally this particle size will be in the order of magnitude of about 8 to about 100-mesh. These limits are, however, not critical in this case. The only critical factor is that the material should be sufficiently small in particle size, so that the reducing gas may have reasonable access thereto within a reasonable time.

The first step of the process is the removal of a major part, i. e., about 80%, of the oxygen which is initially combined with iron as one or more of the oxides of iron. This much of the oxygen removal may be accomplished quite readily in a number of ways which will occur to those skilled in the art. This portion of the process should be carried out at a sufficiently low temperature so that no great amount of sintering will occur, i. e., at temperatures of not more than about 900° C. By reducing without substantially sintering, the remaining oxygen, which is combined with iron, will not be physically shielded from contact with reducing gases, which are and are to be employed in this and the subsequent reducing steps of the process.

The reduction may be effected by the use of any suitable reducing gas supplied to and/or generated in the zone in which this portion of the reduction takes place. For example, CO, $H_2$, $CH_4$, $NH_3$, or mixtures of one or more of these gases may be relied on in effecting the reduction. Any one or more of these gases may be supplied as such to a zone in which the reduction is carried on. If desired, CO and $H_2$ may be generated in situ by supplying some carbon to the reducing zone and by supplying water, usually in the form of water vapor (steam), to react therewith according to the well known water gas reaction. Carbon monoxide also may be generated by the reaction between $CO_2$ and carbon. Hydrogen and carbon may be supplied by the breaking down of $CH_4$ and/or other hydrocarbons, such as are found in natural gas and in various petroleum materials. Any combination of these or other known ways of supplying reducing gases to effect the desired reduction of about the first 80% of the iron oxides present may be employed.

During the first 80% of the reduction, i. e., the elimination of the first 80% of the oxygen introduced combined with iron, the prior art methods of reduction may, if desired, be followed. It has also been found that when some gaseous HCl is present in the gases during this portion of the reduction, that the speed of reduction is in general somewhat accelerated, particularly in the intermediate temperature range in which it is contemplated that this reduction will take place, i. e., from about 650° C. to about 760° C. This acceleration of the rate of reduction is illustrated by examples hereinafter given.

The present invention deals primarily with the reduction of the last final 20% of the oxygen of iron oxide in completing the reduction. In this portion of the reduction, the prior art has been uniformly unsuccessful from a commercial point of view in ever completing the reduction in the temperature range contemplated in accordance with the present invention. Perhaps this is due to the fact that the reaction tends to proceed towards some intermediate equilibrium and the presence of the reduction products tends to prevent completion of the reaction. However, irrespective of the reasons for the failure of the prior art to achieve complete reduction in this temperature range, the fact remains that the prior art has failed. Experimental work carried on in connection with the development of the present invention has shown, for example, that the degree of reduction tends to level off at some point usually somewhat above 80% and short of 100%. In some instances this levelling off occurs below 90%, while in other cases when sufficient time is given and particularly at higher temperatures, the levelling off occurs above 90%.

It has been found in accordance with the present invention that when some gaseous HCl is present in the reducing gases and when the conditions are such that there will also be hydrogen present, the reducing reaction may be carried completely to 100%, and further, that the rate of this reducing reaction at levels above 80% reduction is accelerated in respect to the rates which would be obtained if HCl were absent. These statements are substantiated by examples hereinafter given.

In the final 20% of the reduction, as noted above, hydrogen must be present. This hydrogen need not be introduced as such, however, but may be produced or generated in situ by some reaction of the gases present with one another or with some solid material also present. This has been referred to above and will not be here repeated. The percentage of hydrogen which must be present is not particularly critical as far as is known, although with higher percentages of hydrogen in the reducing gases, the rate of reduction may be substantially accelerated. Therefore, the requirements for hydrogen are to be coordinated with the time permitted for the reaction to be completed and also with the temperature at which the reaction takes place. It will be understood that at higher temperatures, the reduction rate is greater. The preferred conditions for maximum reduction rate and corresponding minimum time for the complete reduction are present when the reducing gases consist, apart from some water vapor, of hydrogen and HCl.

While it is important, to some extent at least from the point of view of reaction rate, that gaseous HCl be present during some part of the first 80% of the reduction, it is found to be essential in accordance with the present invention that such gaseous HCl be present during the final 20% of the reduction. The concentration of HCl required during this final 20% of the reduction will now be discussed.

It has been found that any amount of gaseous HCl present, even a trace, will serve to improve the rate of reaction during this final 20% of the reduction. Thus, the present invention contemplates as a minimum HCl concentration even a trace. For the purposes of rendering this disclosure reasonably definite from a mathematical point of view and so as to eliminate such minor and negligible improvements as might be obtained by the presence of extremely small quantities of HCl, this minimum concentration may be taken to be 0.1% by volume for the purposes of the present invention.

The maximum concentration of gaseous HCl usable in accordance with the present invention is determined by what is in effect a functional limit, that is, an amount of HCl, which is not more than that which will chloridize iron or oxides of iron to form some chloride of iron as $FeCl_2$ at a rate substantially faster than that at which such chloride of iron can be reduced to elemental iron by the hydrogen present in the gaseous medium. It has been found, for example, that when iron or iron oxides are exposed to relatively high concentrations of HCl, even in gases containing some hydrogen, there is a tendency to convert iron initially present as elemental iron or as one or more of the oxides of iron to one or more of chlorides of iron, usually $FeCl_2$. This tendency to chloridize is opposed by the tendency for iron chlorides to react with hydrogen to form elemental iron and to reform gaseous HCl. There is thus present what is in effect an equilibrium system, depending upon HCl concentration and hydrogen concentration as well as upon temperature. From a practical point of view, it has been found that even when the gases present consist, apart from water vapor, solely of hydrogen and HCl, the HCl concentration should never exceed about 10% to 15%. When lower concentrations of hydrogen are used, somewhat lower concentrations of HCl must be used. Thus if a mathematical limit is to be given to the maximum HCl concentration for the purpose of this case, it is in the order of magnitude of 10% to 15% by volume. Practically the HCl concentration should be from about 0.5% up to about 8⅓%. However, in the particular portion of the entire reduction to which the present invention is specifically applicable, i. e., the final 20% of the reduction, the preferred HCl concentration is relatively low and is in the order of magnitude of about 1% by volume.

The HCl concentrations as above given, are rather intimately related to what is presently believed to be the correct theory explaining the superior results which have been obtained in accordance with the present invention. It is believed, for example, that iron oxides, wherein iron has an average valence of more than two, are reduced to iron with a valence of two, by reaction with some of the reducing gases present. Thus it may be assumed for the purposes of the explanation of the present theory, at least, that iron is reduced to its elemental form only when it is present, at least momentarily, in the form of FeO. This FeO is believed to react more readily with HCl to form $FeCl_2$ than directly with any of the reducing gases tending to reduce it to elemental iron. Here again the $FeCl_2$ which is believed to be produced momentarily as a transient intermediate product, is much more easily attacked by hydrogen than is FeO. As a result, it is believed that this $FeCl_2$ formed by reaction of FeO with HCl is reduced by reaction with hydrogen at substantially the same rate as that at which it is formed, so as to give as the final product, elemental iron, and so as simultaneously to regenerate gaseous HCl. Thus the HCl present acts in effect as a catalyst, entering into reactions momentarily, but being regenerated without permanent loss, considering the over-all process. This theory supports and coordinates with the upper limit of concentration of HCl, which is determined in accordance with this invention in that, if the HCl present be of such high concentration as to chloridize iron more rapidly than iron chloride can be reduced, the desired results in accordance with the present invention will not be attained.

While the various theories just expounded are believed to be applicable to some extent at least in that portion of that reduction below 80%, they are relatively unimportant in that portion of the reduction, as the results can be attained, with perhaps a slight variation in time required, without HCl being present. However, in the final 20% of the reduction, the presence of HCl is believed to be essential in order that the desired acceleration of the reduction rate in this portion of the reduction and the desired completion of the reaction be attainable.

The next point to be discussed is the effect of the water vapor in the gases in contact with the material in the reducing zone. Water vapor will inevitably be present, as it is a product of the reducing reaction between any hydrogen which may react with any iron oxide directly or indirectly. As water vapor is a product of this reaction, it will naturally be assumed that the concentration thereof should be kept as low as possible in order that the reaction may be permitted to be carried forward without being unduly retarded, following accepted mass action principles. It is found, however, in accordance with the present invention that while water vapor tends to retard the rate of reaction as the percentage of water vapor in the gases is increased, such retardation is diminished by the presence in the gases of HCl. Thus the HCl, in addition to serving as a catalyst as aforesaid, seems to further the rate of reaction by reducing the retarding tendency of the water vapor which is inevitably present. This novel result was completely unexpected when the present invention was being developed, but was discovered by plotting reaction rates with and without HCl present and with and without water vapor present in a substantial amount. The results here qualitatively described are illustrated in examples hereinafter given.

In the ordinary operation of the present process, the entire reducing reaction will usually be carried out in a single apparatus or in a single series of sequential steps, as during the flow of solid material through a single apparatus. It is contemplated, however, that the first portion, i. e., up to about 80% of the reduction, could take place in one or more steps in an apparatus separate and distinct from that in which the final 20% portion of the reduction takes place in accordance with the present invention. The reduction operation, or any or all parts thereof, may take place in what is termed for the purpose of the present description a "reducing zone." Such a zone may thus form a part of one or more pieces of apparatus. In any event the same type apparatus may be used in carrying out all or different portions of the reducing operation; with the exception, however, that when gaseous HCl is to be used, the apparatus to be used must be so chosen as to accommodate itself to the use of HCl without undue deterioration by chemical action by reason of the gaseous HCl present.

While the process of the present invention may be carried on in a number of different types of apparatus, it is preferred to use some apparatus giving a maximum of gas-to-solid contact. Such apparatus is now well known in the art so that illustrations are thought not to be necessary at this time. For example, a material to be reduced may be introduced into a suitable apparatus, which from the point of view of the present invention, may be termed a reducing zone, and while in this zone and at a desired temperature in the stated range, the material may have brought into contact therewith, a gas in accordance with the present invention. This gas may, for example, be caused to flow upwardly through a mass of discrete particles of the material to be reduced, so as to maintain the mass in a fluidized condition. Other types of gas-to-solid contact equipment may be used in the practice of the process as will occur to those skilled in the art from the foregoing description.

The next and last phase of the invention to be considered in principle is the effect of temperature. As would be expected, the rate of the reduction is accelerated by increasing temperatures. From the point of view of the present invention, the minimum temperature contemplated is about 600° C., for at lower temperatures, pyrophorism is encountered to an undesired extent and resort must be had to the invention set forth in the Crowley application, Ser. No. 160,829, for operation in that low temperature range. Furthermore, from the point of view of the present invention, the rate of reduction, particularly of the completion of the reduction in the final 20% is so low, below about 600° C., that such lower temperatures are not presently contemplated for use. Thus the low temperature limit for the purpose of the present application may be said to be about 600° C. It has been found, for example, that at these lower temperatures (i. e. below about 600° C.), the presence of gaseous HCl does not seem to accelerate the reduction reaction, but may on the other hand tend even to retard it to some extent.

The upper limit of temperature is chosen in accordance with the present invention at about 900° C. for two principal reasons. In the first place the rate of the reduction at this temperature is relatively high, so that the accelerating effect of the presence of HCl becomes relatively unimportant and tends to be quite small and in some instance may appear to vanish or even to change to a deceleration. What is probably a more important reason, however, is that as the temperatures are raised over about 900° C., the tendency for the solid material to sinter becomes increasingly great. If this sintering were permitted to take place to any substantial extent, it would result in a masking of the unreduced iron oxide particles, preventing them from contacting with the hydrogen and/or HCl present in the gases and thus preventing their effective and complete reduction in accordance with the present invention. This undesired sintering reaction further tends to prevent the maintenance of a fluidized bed, which is as aforesaid the preferred arrangement, offering a maximum gas-to-solid contact between the iron oxides to be reduced and the gases present as aforesaid.

It is usually preferred, however, to operate in some intermediate range inside the extreme limits of temperature above described, preferably in the range of about 650° C. to about 760° C. as in that intermediate range, the difficulties which dictate the extreme limits of the range as aforesaid are notably absent.

The process of the present invention is illustrated as to its several phases by the following examples:

*Example 1.*—This example is given for the purpose of illustrating the fact that below about 600° C. the presence of HCl in the reducing gases does not appear to accelerate the reduction.

Two samples of a natural ore, known as Tobin ore, were reduced. This ore has the following composition as determined by chemical analysis:

| | Per cent |
|---|---|
| Moisture loss | 9.42 |
| Ignition loss | 1.53 |
| SiO$_2$ | 11.92 |
| Fe | 48.1 |
| CaO | 0.81 |
| P | 0.3 |
| S | 0.2 |
| MgO | 0.51 |
| Al$_2$O$_3$ | 1.62 |
| Mn | 0.2 |

The first of these two samples was reduced by passing a stream of gas consisting of 99% (by volume) hydrogen and 1% HCl, upwardly through a mass formed of discrete particles of the ore. The particle size was in the range of about 35-mesh to about 100-mesh, the gas flowing upwardly through the mass and maintaining the particles in a fluidized condition. The temperature of the mass in the reducing zone was maintained at about 538° C. The gas passed upwardly through the mass at the rate of about 40 cc. per minute. The treatment was carried on in this manner for 10½ minutes, at the conclusion of which it was found by analysis that 6.3% of the iron present had been reduced to metallic iron.

The second of these samples was treated in exactly the same way, except that the gas employed consisted of pure hydrogen. In the same time period 7.2% of the iron present was reduced to metallic iron. It is concluded, therefore, that at this temperature, the presence of HCl is insufficient to accelerate the rate of reduction.

*Example 2.*—This example is given to illustrate that at about 600° C., under conditions substantially the same as in Example 1, some acceleration of the rate of reduction is obtained.

In this example, two samples of the same Tobin ore as in Example 1, were reduced under the same conditions stated in Example 1, one with pure hydrogen and the other with hydrogen containing 1% (by volume) HCl. The samples were reduced for the same time period of 10½ minutes. The sample which was reduced in pure hydrogen had 89% of the oxygen, which had been combined with iron eliminated therefrom, while that reduced in hydrogen plus 1% HCl and 91% of its similarly combined oxygen removed.

While this gain is not striking, the example illustrates the fact that at 600° C. the accelerating effect of HCl begins to be felt; and further, that even in a 10½ minute period, the degree of reduction is over the 80% figure arbitrarily chosen in this case, so that the acceleration is present in this higher range of the reduction.

*Example 3.*—This example is given to show the effect of the use of HCl in accelerating the reduction in a middle point in the temperature range and to show wherein the presence of HCl makes possible the reduction in the desired higher range portion as compared with the prior art methods, wherein it was difficult to exceed 80% reduction.

Two samples of the same Tobin ore, as in Example 1, were reduced under the conditions described in that example, both for a time period of 9 minutes, and both at 760° C. The first of these samples was reduced using pure hydrogen as a reducing gas; and in the second, there was used hydrogen to which was added about 1% by volume gaseous HCl. In the time provided in the first sample, 77% reduction was attained, as measured by the percentage of the oxygen which had been combined with iron and which was removed from the sample. In the sample reduced with hydrogen plus HCl, under the same conditions otherwise, 89% reduction measured in the same way, was obtained.

*Example 4.*—The purpose of the example is to illustrate the results obtained when it is attempted to effect the reduction at 900° C. and above.

In a first test at 900° C., two samples of the same Tobin ore described in Example 1, were reduced, both for a period of 30 minutes. One of these two samples was reduced in pure hydrogen and the other in hydrogen containing about 1% (by volume) gaseous HCl. It was found that the sample reduced in pure hydrogen had 94.8% of its oxygen, which had originally been combined with iron, removed therefrom; while the other sample, reduced in hydrogen plus HCl, only had 93.0% of its similarly combined oxygen removed. It was further noted in both these samples that a substantial amount of sintering had taken place, although the particles could move relative to one another to some extent. It was concluded from this that the effectiveness of HCl in accelerating the reduction at this temperature diminished to substantially the vanishing point; or that such sintering as had occurred had masked the remaining oxide, so as to prevent it being reduced by the hydrogen present.

This was further confirmed by an additional test at 1000° C. under otherwise the same conditions, except that pure hydrogen was used as the reducing gas and only 3 minutes were allowed for the reduction. Under these circumstances, 91.5% of the oxygen, which had been combined with iron, was removed. This example thus serves to illustrate that the reaction apparently occurs to the maximum extent which is possible within a very short period at these higher temperatures; but that the sintering, which was quite substantial in this sample from the observed results, served to prevent further reduction notwithstanding the drastic reducing conditions present.

*Example 5.*—This example is given to illustrate the 100% completion of the reducing reaction.

In this example, two tests were conducted, both using the same Tobin ore and reduction procedure which were used in Example 1 above. Both samples were reduced at 650° C. and for a period of 21 minutes. One of these samples was reduced in pure hydrogen and the other in pure hydrogen to which about 1% gaseous HCl was added. The sample reduced in the pure hydrogen was found to be 94.7% reduced, as determined by the amount of oxygen which had originally been combined with the iron and which had been removed therefrom by the reduction reaction. The other sample, similarly reduced in hydrogen plus 1% HCl, was 100% reduced in this time period.

In this case, the rate of removal of the oxygen originally combined with iron was plotted against the time of reduction. It was found that when no HCl was present, this rate levelled off and presumably never would reach 100%, and further that the degree of reduction given with hydrogen alone is almost, if not quite, the maximum degree obtainable in any time period.

*Example 6.*—This example illustrates particularly the stage of the reduction to which the present invention pertains, that is, the portion starting with material 80% reduced as "semi-reduced material" and then attempting to complete the reduction in accordance with the present invention using HCl, as compared with the use of pure hydrogen.

Two samples of Tobin ore, as in Example 1, were reduced under exactly similar conditions at 650° C. for 7½ minutes (the time being considered from the time that both samples had their first 80% of their oxygen combined with iron removed therefrom). One of these samples was reduced in pure hydrogen, the other in pure hydrogen to which about 1% HCl was added.

Within this time period, the sample reduced in pure hydrogen was somewhat further reduced, so as to give a total reduction, as calculated by oxygen removed as aforesaid, of 85%. In this same time period, calculated from the 80% reduction point, the sample reduced in hydrogen plus HCl, was completely reduced, i. e., 100% of the oxygen originally combined with iron had been removed therefrom to leave all the iron in elemental form.

*Example 7.*—This example has for its purpose to illustrate the subject matter set forth in Example 6, but at higher temperature, i. e., 760° C. The samples used and the method employed were the same as in Example 6 and in Example 1. While the reductions were actually carried out starting from a zero degree of reduction, the degree of reduction was plotted against time, and the time calculated therefrom for each sample, i. e., 8 minutes following the removal of the first 80% of the oxygen originally combined with iron, was the same for both samples. In this time period, the sample reduced in pure hydrogen was 95.5% reduced; while that reduced in hydrogen plus HCl was 100% reduced. One of the plots aforesaid further shows, as to the sample reduced in pure hydrogen, that in 17½ minutes following the 80% reduction point, only about 98% of the oxygen originally combined with iron had been removed therefrom. The curve of reduction against time levelled off at about this value, indicating that irrespective of the length of time provided, complete 100% reduction, even at this high temperature, could not be attained.

*Example 8.*—This example is given to illustrate the effect of the presence of water vapor both with hydrogen alone and with hydrogen plus HCl. The samples tested were all Tobin ore as in Example 1. The temperature of reduction of all samples was 760° C. A number of different samples were reduced using hydrogen plus 1% by volume HCl. In some instances, this gas was substantially dry, while in others the gas contained that amount of water vapor which would represent saturated conditions at 100° C. (about 6.5% by volume water vapor). The results of percentage reduction of the ore as determined by oxygen removal as aforesaid was plotted against time of reduction. These curves were substantially identical with one another, showing that there was little or no difference in the degree of reduction in any given time by reason of the presence of water vapor, when the gas contained HCl.

On the other hand, another set of samples were tested in the same manner, in part with straight hydrogen and without water vapor, and in part with hydrogen with about the same amount of water vapor as used in the samples tested with hydrogen and HCl as aforesaid. The gas used in reducing all these samples contained no HCl. Again, the degree of reduction was plotted against time. The curves here diverged substantially, so that at the 80% degree reduction point, the samples reduced in the moist hydrogen atmosphere took about 20% more time to reach the 80% point than those reduced in dry hydrogen. Above the 80% point, the curves continued to diverge, both levelling off at a degree of reduction less than 100%. The curve showing the use of dry hydrogen levelled off at about 98% as in Example 7, while that showing the use of moist hydrogen levelled off at about 90%. This illustrates the substantial retarding effect of water vapor, particularly where hydrogen alone was used; and the effective nullifying of this retarding effect by the presence of HCl.

*Example 9.*—A series of tests were run using the same Tobin ore as in Example 1, using temperatures in all instances of 650° C., and using times in all instances of 10½ minutes, conditions being otherwise same as in Example 1. In this case the percentage of hydrogen chloride in the gases was varied from zero to about 8⅓%. At this temperature and under the conditions present, the percentage reduction, calculated as in previous examples, went from 21.9% at zero percent by volume HCl, through 39.8% reduction with 0.5% HCl, 66.6% with 1% HCl, and up to 85.0% reduction at about 8⅓% HCl. In plotting these results, the curve showed two substantially different slopes, intersecting at about 1% HCl, the slope up to the 1% HCl value being much greater than that above 1% HCl, when percent HCl was plotted as abscissae and percent reduction as ordinates.

By extrapolation, it is reasonable to conclude that the maximum HCl concentration which could be used to accelerate the reaction in any portion of the reduction and not merely in the final 20% thereof would be about 10% to 15%. This figure was also arrived at by reference to a large amount of other work done in conjunction with treatment of iron oxide-containing materials. This work, however, forms no part of the present invention and hence is not described in any detail herein. The curve plotted in accordance with the data set forth in this example illustrates the acceleration obtained in some portions of the reduction operation by reason of the presence of even a very small amount of HCl. For this reason, it is believed that even a trace will be efficacious in producing some advantageous results. This series of tests further shows a preferred intermediate range of HCl concentrations of about 0.5% to about 8⅓% by volume for accelerating the reduction throughout all portions of the reduction range, i. e., not necessarily restricted to the final 20% thereof, but still including that portion of the range. At the same time, these and the other examples herein given illustrate the fact as stated herein that 1% HCl by volume is efficacious in producing desired results. For this reason and as it is usually undesired to use any more of a corrosive and more or less expensive gas as HCl, and as it is desired to complete the reduction as far as possible, the preferred HCl concentration has been given as about 1%.

While there is herein disclosed the principles upon which this invention is based and there has been taught the best theories presently believed to be true and equivalents to the extent that they are now known, it is obvious that many equivalents will be suggested to those skilled in the art by the present teachings. We do not wish to be limited, therefore, except by the scope of the appended claim, which is to be construed validly as broadly as the state of the prior art permits.

What is claimed is:

The process of accelerating the removal of the final 20% of the oxygen of iron oxide in the direct reduction of iron oxide-containing material to produce elemental iron, which comprises the steps of removing from the iron oxide present at least about 80% of the oxygen thereof to produce a semi-reduced material by the use of a reducing gas which is substantially free of hydrogen halides and halogen in any form which is capable of reaction with hydrogen to form hydrogen halide, thereafter, and while said semi-reduced material is in a reducing zone, contacting said semi-reduced material with a gaseous medium containing hydrogen as an active reducing agent and containing gaseous HCl in a concentration from about 1% to about 8⅓% by volume based upon the total of hydrogen plus HCl, while maintaining said semi-reduced material in said reducing zone during the final reduction thereof in the temperature range of about 600° C. to about 900° C.

References Cited in the file of this patent

UNITED STATES PATENTS

| | | |
|---|---|---|
| 2,199,418 | Redmond et al. | May 7, 1940 |
| 2,418,148 | Williams et al. | Apr. 1, 1947 |
| 2,481,226 | Krebs | Sept. 6, 1949 |

FOREIGN PATENTS

| | | |
|---|---|---|
| 136,817 | Austria | Mar. 10, 1934 |
| 740,913 | Germany | Nov. 1, 1943 |